United States Patent
Kadlecik et al.

(10) Patent No.: US 7,200,839 B2
(45) Date of Patent: Apr. 3, 2007

(54) DEBUGGING TRANSACTIONS ACROSS MULTIPLE PROCESSORS

(75) Inventors: Bradd A. Kadlecik, Wappingers Falls, NY (US); Colette A. Manoni, Brewster, NY (US); Richard W. Potts, Jr., Poughquag, NY (US); Richard E. Reynolds, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 669 days.

(21) Appl. No.: 10/015,029

(22) Filed: Dec. 11, 2001

(65) Prior Publication Data
US 2003/0110473 A1 Jun. 12, 2003

(51) Int. Cl.
*G06F 9/44* (2006.01)
*G06F 3/00* (2006.01)

(52) U.S. Cl. .................. 717/124; 719/317; 717/130

(58) Field of Classification Search ................ 717/124, 717/127, 128, 130, 131; 709/223; 719/317
See application file for complete search history.

(56) References Cited

U.S. PATENT DOCUMENTS

| | | | |
|---|---|---|---|
| 5,548,717 A | 8/1996 | Wooldridge et al. | 395/183.14 |
| 5,794,046 A | 8/1998 | Meier et al. | 395/704 |
| 5,815,653 A | 9/1998 | You et al. | 395/183.14 |
| 6,042,614 A * | 3/2000 | Davidson et al. | 717/116 |
| 6,202,199 B1 * | 3/2001 | Wygodny et al. | 717/125 |
| 2003/0056200 A1 * | 3/2003 | Li et al. | 717/128 |

OTHER PUBLICATIONS

"Business Wire", Oct. 20, 1998, "New TotalView Multi-Process Debugger for Large Complex Applications on Parallel and Distributed High Performance Computer Systems".
Myung et al. ("Development of a Distributed Debugger UniVIEW") Journal of KISS Computing Practices, Aug. 1998, pp. 527-541 (Abstract Only).
Harrison et al., "Tools For Multiple-CPU Environments", (IEEE Software pp. 45-51, May 1990).

* cited by examiner

*Primary Examiner*—Tuan Dam
*Assistant Examiner*—John Romano
(74) *Attorney, Agent, or Firm*—Lily Neff, Esq.; Heslin Rothernberg Farley & Mesiti P.C.

(57) ABSTRACT

Debugging of a transaction across multiple processors is facilitated by having debug information follow the transaction from processor to processor. The transaction can be debugged across processors without predefining the transaction path, and without performing a debug registration process between the client controlling the debugging and each processor of the multiple processors.

36 Claims, 4 Drawing Sheets

DEBUGGING TRANSACTIONS ACROSS MULTIPLE PROCESSORS

TECHNICAL FIELD

This invention relates, in general, to debugging of transactions, and in particular, to the debugging of a transaction across multiple processors, in which the path of the transaction need not be predefined.

BACKGROUND OF THE INVENTION

A transaction is considered a unit of work, which includes a plurality of requested services, such as a plurality of computer programs or applications. Each application is developed using a programming language. During the course of programming, errors may occur due to programmer error. These errors include either syntax errors or logic errors. Syntax errors are caught by the compiler, which refuses to generate machine instructions for a line of programming language that it does not understand. Logic errors, however, are detected when the application does not perform as expected, often resulting in program exceptions or incorrect behavior.

While syntax errors can be corrected by determining the correct syntax, logic errors are often much more difficult to ascertain. For this reason, a special class of computer programs was developed. These programs are called debuggers. A debugger allows the user to trace through a program, while it is executing on the computer, often in the original human-readable text format originally used in the programming language. This allows the programmer to determine the instance or instances where the logical flow of the program is incorrectly designed.

Traditional debuggers run on a given application with a fixed starting and ending point, and only run on the machine where the application was started. These debuggers have proven inadequate, however, for distributed applications and for transactions that span across processors. For example, for many server transactions, the data required to satisfy a given request may not reside on the server to which the request was sent. To satisfy the request, the server initiates a request to another server, which may or may not initiate another request, until information is gathered to satisfy the initial request. While this provides a friendly environment for the end user of the transaction, it is a difficult environment on which to build the transaction.

Some debuggers have been enhanced in order to be able to debug a distributed application that executes on multiple processors. With those debuggers, however, each processor to run the application needs to be known in advance, and a debug registration process needs to be performed on each of the processors. This has proved inadequate, especially for transactions that span processors.

Based on the foregoing, a need still exists for a capability that allows a transaction to be debugged across a plurality of processors. In particular, a need still exists for a capability that facilitates the debugging of a transaction across multiple processors without predefining the path of the transaction. A yet further need exists for a capability that facilitates the debugging of a transaction across multiple processors without requiring a debug registration process to be performed on each processor in which the transaction is to be run and debugged.

SUMMARY OF THE INVENTION

The shortcomings of the prior art are overcome and additional advantages are provided through the provision of a method of facilitating debugging of transactions. The method includes, for instance, executing a transaction on one processor of a plurality of processors, the transaction having debug information associated therewith; and requesting, by the transaction, a service on another processor of the plurality of processors, wherein at least a portion of the debug information follows the transaction to the another processor for use in debugging the transaction on the another processor, and wherein a path of the transaction is not predefined to a controller of the debugging.

In a further embodiment, a method of facilitating debugging of transactions is provided. The method includes, for instance, using a client workstation to enter debug information on a processor where a transaction is to be started, the debug information being associated with tracing the transaction; attaching at least a portion of the debug information to the transaction being executed on the processor; requesting, by the transaction, a service on another processor; and passing at least some of the at least a portion of the debug information to the another processor, wherein tracing of the transaction can continue on the another processor.

System and computer program products corresponding to the above-summarized methods are also described and claimed herein.

Advantageously, the debugging of a transaction across a plurality of processors is facilitated by providing debug information that follows the transaction from processor to processor. The path of the transaction need not be predefined. Further, there is no need for the client workstation, which is controlling the debugging, to perform a registration process on each processor that the transaction is to run on and be debugged.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a capability is provided for facilitating the debugging of transactions across multiple processors. In one example, debug information is attached to a transaction and that information follows the transaction from processor (e.g., server) to processor (e.g., server) without requiring a pre-definition of the path of the transaction. Further, it is not necessary to perform a debug registration process at each processor of the multiple processors.

Figure 1A:
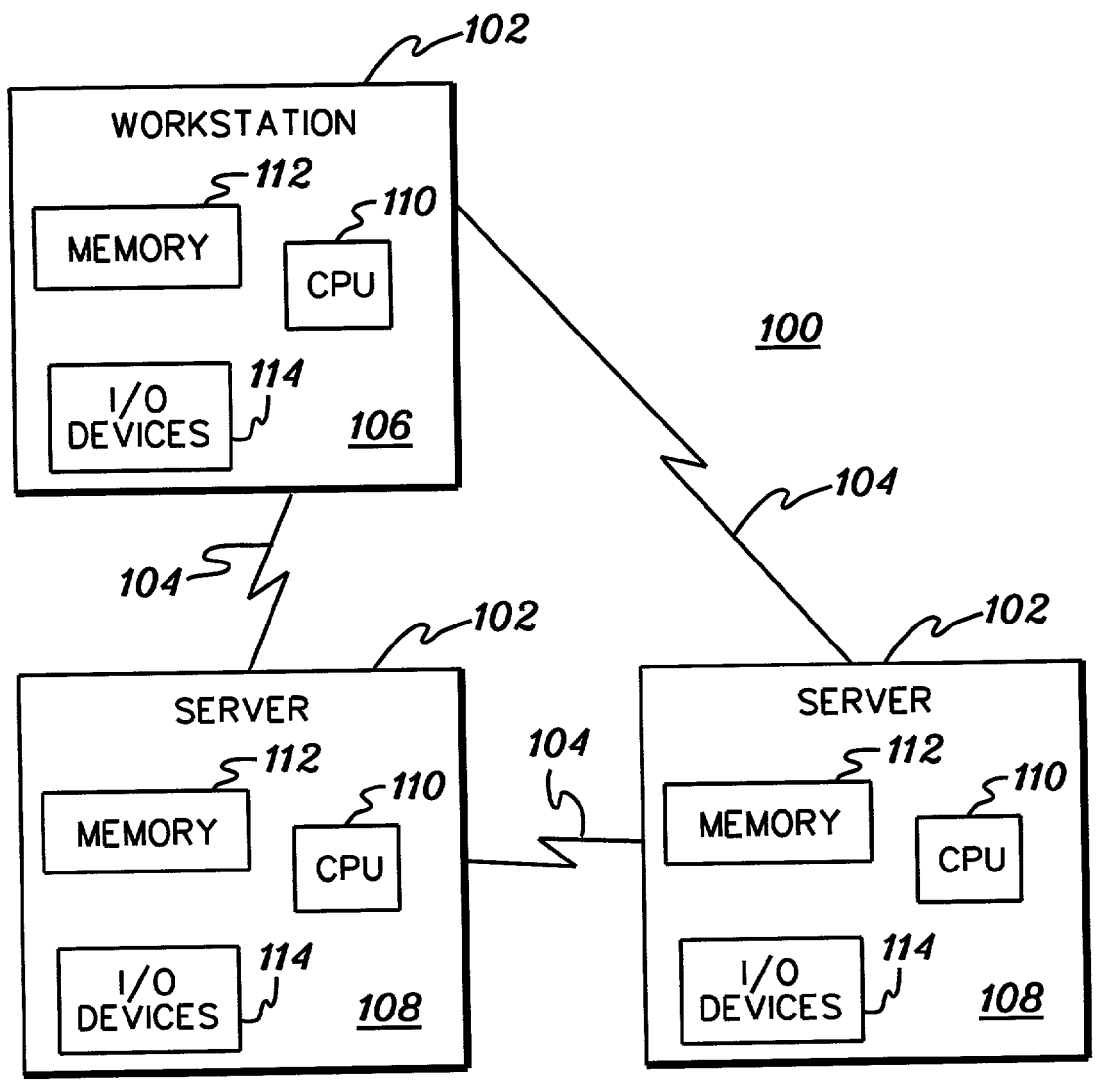
FIG. 1a depicts one embodiment of a computing environment incorporating and using one or more aspects of the present invention.

One embodiment of a computing environment incorporating and using one or more aspects of the present invention is depicted in FIG. 1a. A computing environment 100 includes, for instance, a plurality of computing units 102 coupled to one another via one or more connections 104. In one example, one of the computing units is a client workstation 106 executing an operating system, such as Windows NT or LINUX, as examples, and at least two other computing units are servers 108 executing, for instance, the z/OS or OS/390 operating system offered by International Business Machines Corporation, Armonk, N.Y. Each computing unit includes, for example, a central processing unit (CPU) 110, a memory 112 and one or more input/output devices 114, which are well known in the art.

Connection 104 is, for instance, a TCP/IP connection. In other embodiments, however, connection 104 may be any type of connection, such as a wire connection, token ring or network connection to name just a few examples.

The computing environment described above is only one example. One or more aspects of the present invention can be incorporated and used with other types of computing units, computers, processors, nodes, systems, workstations and/or other environments, without departing from the spirit of the present invention.

In accordance with an aspect of the present invention, executing within the computing environment is a debugger. As one example, this debugger is a distributed debugger, in which components of the debugger are running on the various computing units.

Figure 1B:
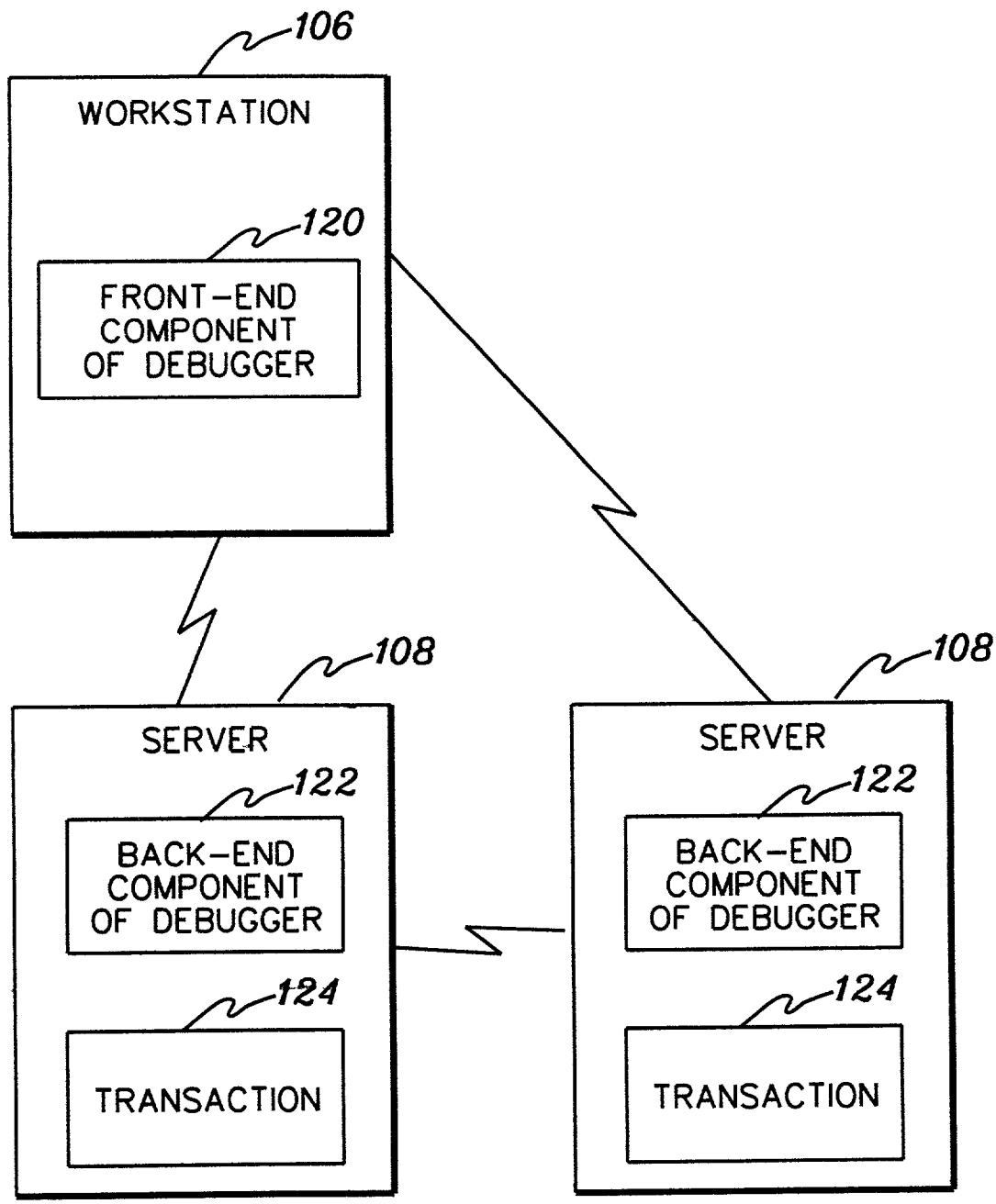
FIG. 1b depicts one embodiment of a distributed debugger executing within the computing environment of FIG. 1a, in accordance with an aspect of the present invention.

For example, as shown in FIG. 1b, a front-end component of a debugger 120 is executing on workstation 106 and a back-end component of the debugger 122 is executing on each of servers 108. The front-end component includes a user interface to facilitate user input to the debugger (one example of an interface is included with the IBM Distributed Debugger); and the back-end components include the logic used in performing the debugging of a user's transaction 124 executing on servers 108. One example of a back-end component is the TPF Debugger Engine, offered by International Business Machines Corporation, Armonk, N.Y.

In accordance with an aspect of the present invention, the debugging of a transaction executing across servers 108 is facilitated by enabling a given transaction to be followed from system to system while debugging the transaction. One embodiment of the logic associated with such a capability is described with reference to FIGS. 2 and 3. As one example, at least a portion of this logic would be included within servers 108.

Figure 4:
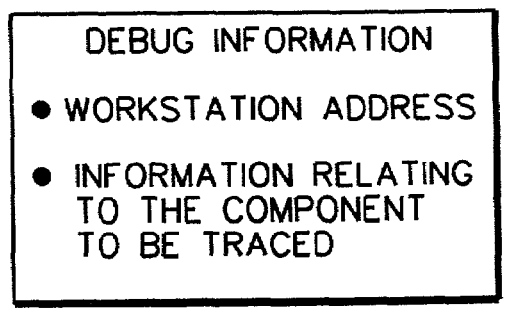
FIG. 4 depicts one embodiment of debug information, in accordance with an aspect of the present invention.

To commence a debug session, a developer enters debug information into the host system (e.g., Server 1 of FIG. 3), where a transaction to be traced is to be started, STEP 200. The entering of the debug information at the host system is part of a registration process performed between the client workstation and the host. The information is input via, for instance, the front-end component of debugger 120 executing on client workstation 106, and includes, for instance, an address (e.g., id and port #) of the client workstation, as well as information relating to the component to be traced (see FIG. 4). This component information includes, for instance, the transaction name and/or terminal address of where the transaction originated.

Figure 2:
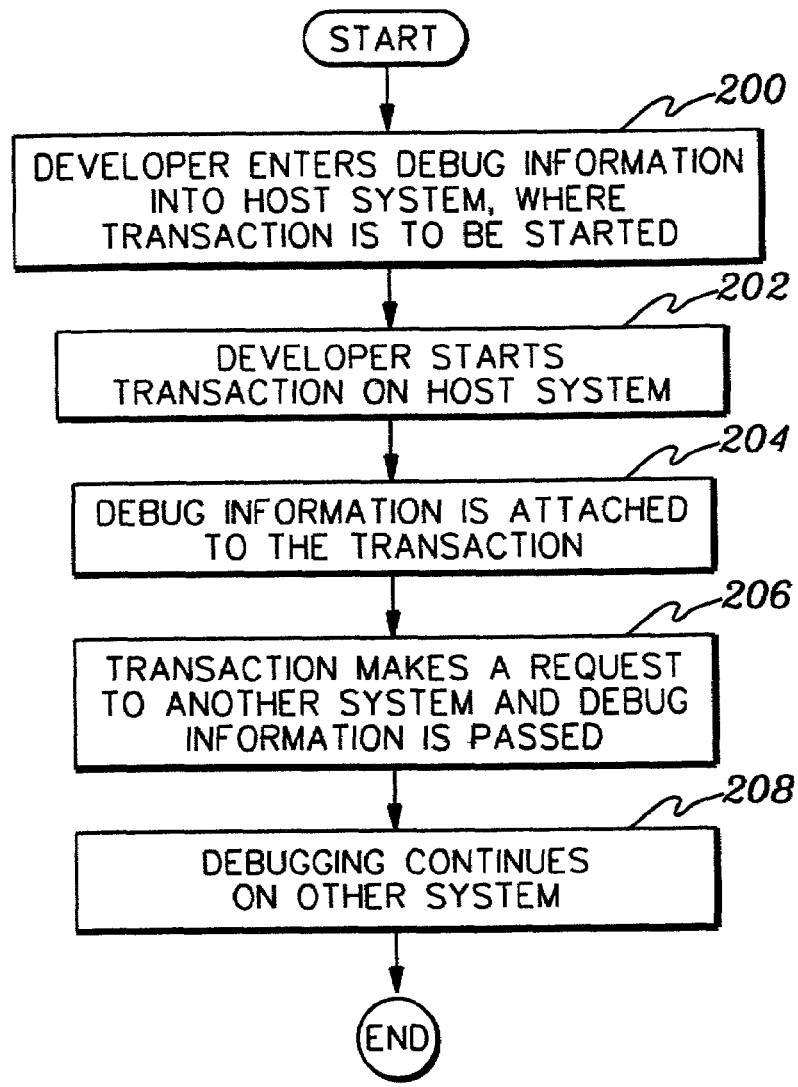
FIG. 2 depicts one embodiment of the logic associated with facilitating debugging of a transaction across multiple processors, in accordance with an aspect of the present invention.
Figure 3:
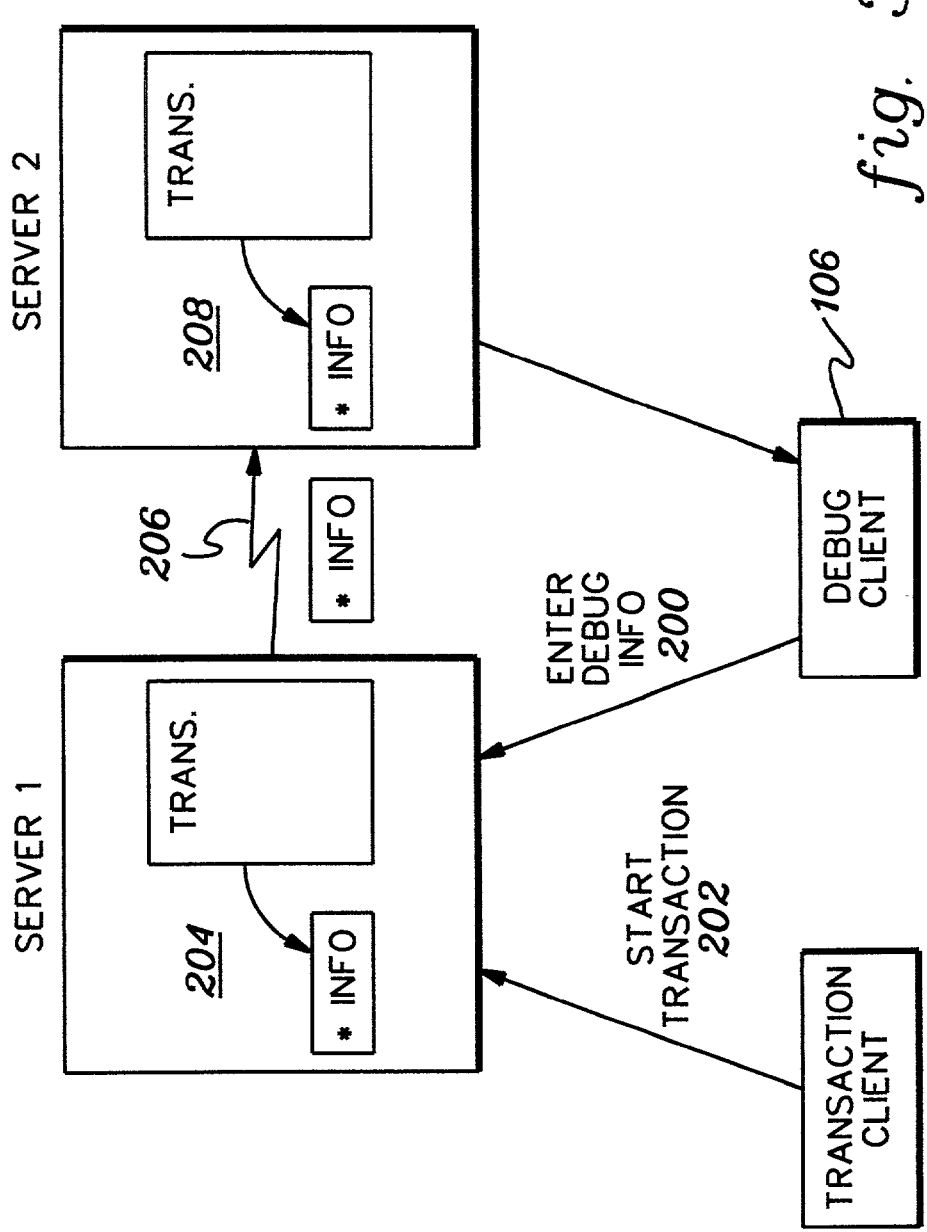
FIG. 3 pictorially illustrates aspects of the logic of FIG. 2, in accordance with an aspect of the present invention.

Thereafter, the developer starts the transaction on the host system, STEP 202 (FIGS. 2 & 3). The transaction is a unit of work that may request a plurality of services, including execution of one or more programs.

The debug information is attached to the transaction, STEP 204. For example, when the transaction begins, the debugger checks a debugging table to determine if this transaction is to be debugged. If so, then the debug information is included with the identifying information of the transaction. For example, the debug information is attached to the transaction by storing a pointer to the debug information in the transaction control block.

During processing of the transaction, the transaction makes a request to another system (e.g., Server 2 of FIG. 3). In accordance with an aspect of the present invention, the debug information is passed as part of this request, STEP 206. As one example, when the transaction sets up a communication session with another host, the system service (e.g., the communication protocol establishing the session, which is part of the operating system or library code) takes a copy of the debug information and attaches it to the request. For instance, the debug information is included as part of the header information that the operating system wraps around the application data.

Thereafter, when the requested service is started on the other system, the debugger detects the debug information and establishes a new debug session with the workstation, which allows tracing to continue without having the client workstation register with the new host, STEP 208. Further, the client workstation need not know beforehand the path of the transaction. As the debugging progresses on the new server, the information is passed back to the client workstation. Should the transaction request yet another service, then the above procedure would be continued.

Advantageously, an aspect of the present invention enables a developer to trace all parts of the transaction. In addition, multiple parts of a specific transaction, which are difficult to identify, are traced. For example, assume Program A running on Processor 1 invokes Program B running on Processor 2. It is helpful to trace the specific instances of Program A and Program B, but if Program B is being invoked many times in Processor 2, then, in the past, the specific instance of Program B was difficult to identify to trace (without tracing all of the other extraneous instances of Program B). However, in accordance with an aspect of the present invention, the starting of Program B on Processor 2 with the debug information ties these two parts of the transaction together, which allows the user to specifically trace all pieces of a given transaction, without tracing unrelated transactions.

Described in detail above is a capability for facilitating the debugging of transactions across multiple processors. The debugging is performed without having the client workstation perform debug registration with each host or server executing the transaction being debugged, and without predefining the transaction path. Instead, debug information is attached to the transaction and follows the transaction along its path.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating debugging of transactions, said method comprising:
    executing a transaction on one processor of a plurality of processors, said transaction having debug information attached to the transaction;
    requesting by said transaction, a service on another processor of said plurality of processors, wherein said attached debug information is passed with the transaction from the one processor to the another processor eliminating a need for attaching the debug information at the another processor wherein a path of the transaction is not predefined to a controller of the debugging, and wherein at least a portion of said attached debug information is used to automatically establish a new debug session at the another processor without intervention; and
    providing, by the controller to the one processor, at least part of the debug information, wherein said controller is different from the one processor and the another processor, and wherein said debug information is provided to the another processor without said controller performing debug registration with the another processor.

2. The method of claim 1, further comprising attaching said debug information to said transaction being executed on said one processor.

3. The method of claim 1, wherein said debug information follows the transaction to the another processor by including the debug information in a communications session established with said another processor.

4. The method of claim 1, wherein said debug information comprises information relating to said transaction.

5. The method of claim 1, wherein said debug information comprises an identifier of the controller of the debugging.

6. The method of claim 1, wherein said controller comprises a client workstation coupled to said one processor and said another processor.

7. The method of claim 1, wherein said service comprises executing an application on said another processor.

8. A method of facilitating debugging of transactions, said method comprising:
    using a client workstation to enter debug information on a processor where a transaction is to be started, the debug information being associated with tracing the transaction;
    attaching at least a portion of the debug information to the transaction being executed on the processor;
    requesting by the transaction, a service on another processor; and
    passing with the transaction the attached debug information from the processor to the another processor eliminating a need for attaching the debug information at the another processor, wherein at least a portion of the attached debug information is used to automatically establish a new debug session at the another processor without intervention such that tracing of the transaction can continue on the another processor without the client workstation performing debug registration with the another processor, and wherein the client workstation is different from the processor and the another processor.

9. The method of claim 8, wherein the tracing can continue without performing a debug registration process between the client workstation and the another processor.

10. The method of claim 8, wherein the tracing can continue without having the client workstation provide the at least a portion of the debug information to the another processor.

11. The method of claim 8, wherein the tracing may continue without predefining to the client workstation the path taken by the transaction.

12. A system of facilitating debugging of transactions, said system comprising:
    means for executing a transaction on one processor of a plurality of processors, said transaction having debug information attached to the transaction;
    means for requesting, by said transaction, a service on another processor of said plurality of processors, wherein said attached debug information is passed with the transaction from the one processor to the another processor eliminating a need attaching the debug information at the another processor, wherein a path of the transaction is not predefined to a controller of the debugging, and wherein at least a portion of said attached debug information is used to automatically establish a new debug session at the another processor without intervention; and
    means for providing, by the controller to the one processor, at least a part of the debug information, wherein said controller is different from the one processor and the another processor, and wherein said debug information is provided to the another processor without said controller performing debug registration with the another processor.

13. The system of claim 12, further comprising means for attaching said debug information to said transaction being executed on said one processor.

14. The system of claim 12, wherein the debug information follows the transaction to the another processor by including the debug information in a communications session established with said another processor.

15. The system of claim 12, wherein said debug information comprises information relating to said transaction.

16. The system of claim 12, wherein said debug information comprises an identifier of the controller of the debugging.

17. The system of claim 12, wherein said controller comprises a client workstation coupled to said one processor and said another processor.

18. The system of claim 12, wherein said service comprises executing an application on said another processor.

19. A system of facilitating debugging of transactions, said system comprising:
- a client workstation to enter debug information on a processor where a transaction is to be started, the debug information being associated with tracing the transaction;
- means for attaching at least a portion of the debug information to the transaction being executed on the processor;
- means for requesting, by the transaction, a service on another processor; and
- means for passing with the transaction the attached debug information from the processor to the another processor eliminating a need for attaching the debug information at the another processor, wherein at least a portion of the attached debug information is used to automatically establish a new debug session at the another processor without intervention such that tracing of the transaction can continue on the another processor without the client workstation performing debug registration with the another processor, and wherein the client workstation is different from the processor and the another processor.

20. The system of claim 19, wherein the tracing can continue without performing a debug registration process between the client workstation and the another processor.

21. The system of claim 19, wherein the tracing can continue without having the client workstation provide the at least a portion of the debug information to the another processor.

22. The system of claim 19, wherein the tracing may continue without predefining to the client workstation the path taken by the transaction.

23. A system of facilitating debugging of transactions, said system comprising:
- a processor of a plurality of processors to execute a transaction, said transaction having debug information attached to the transaction; and
- another processor of said plurality of processors to have a service requested by said transaction, wherein said attached debug information is passed with the transaction from the one processor to the another processor eliminating a need for attaching the debug information at the another processor, wherein a path of the transaction is not predefined to a controller of the debugging, wherein the controller is different from the processor and the another processor, and wherein at least a portion of said attached debug information is used to automatically establish a new debug session at the another processor without intervention, and without the controller performing debug registration with the another processor.

24. A system of facilitating debugging of transactions, said system comprising:
- a client workstation to enter debug information on a processor where a transaction is to be started, the debug information being associated with tracing the transaction;
- the processor adapted to attach at least a portion of the debug information to the transaction being executed on the processor;
- another processor having a service requested by the transaction; and
- a communications protocol to facilitate passing with the transaction the attached debug information from the processor to the another processor eliminating a need for attaching the debug information at the another processor, wherein at least a portion of the attached debug information is used to automatically establish a new debug session at the another processor without intervention such that tracing of the transaction can continue on the another processor without the client workstation performing debug registration with the another processor, and wherein the client workstation is different from the processor and the another processor.

25. At least one program storage device readable by a machine tangibly embodying at least one program of instructions executable by the machine to perform a method of facilitating debugging of transactions, said method comprising:
- executing a transaction on one processor of a plurality of processors, said transaction having debug information attached to the transaction;
- requesting by said transaction, a service on another processor of said plurality of processors wherein said attached debug information is passed with the transaction from the one processor to the another processor eliminating a need for attaching the debug information at the another processor, wherein a path of the transaction is not predefined to a controller of the debugging, and wherein at least a portion of said attached debug information is used to automatically establish a new debug session at the another processor without intervention; and
- providing, by the controller to the one processor, at least a part of the debug information, wherein said controller is different from the one processor and the another processor, and wherein said debug information is provided to the another processor without said controller performing debug registration with the another processor.

26. The at least one program storage device of claim 25, wherein said method further comprises attaching said debug information to said transaction being executed on said one processor.

27. The at least one program storage device of claim 25, wherein said method further comprises providing, by the controller to the one processor, at least a part of the debug information, and wherein said debug information is provided to the another processor independent of said controller.

28. The at least one program storage device of claim 25, wherein the debug information follows the transaction to the another processor by including the debug information in a communications session established with said another processor.

29. The at least one program storage device of claim 25, wherein said debug information comprises information relating to said transaction.

30. The at least one program storage device of claim 25, wherein said debug information comprises an identifier of the controller of the debugging.

31. The at least one program storage device of claim 25, wherein said controller comprises a client workstation coupled to said one processor and said another processor.

32. The at least one program storage device of claim 25, wherein said service comprises executing an application on said another processor.

33. At least one program storage device readable by a machine tangibly embodying at least one program of instructions executable by the machine to perform a method of facilitating debugging of transactions, said method comprising:

using a client workstation to enter debug information on a processor where a transaction is to be started, the debug information being associated with tracing the transaction;

attaching at least a portion of the debug information to the transaction being executed on the processor;

requesting, by the transaction, a service on another processor; and passing with the transaction the attached debug information from the processor to the another processor eliminating a need for attaching the information at the another processor, wherein at least a portion of the attached debug information is used to automatically establish a new debug session at the another processor without intervention such that tracing of the transaction can continue on the another processor without the client workstation performing debug registration with the another processor, and wherein the client workstation is different from the processor and the another processor.

34. The at least one program storage device of claim 33, wherein the tracing can continue without performing a debug registration process between the client workstation and the another processor.

35. The at least one program storage device of claim 33, wherein the tracing can continue without having the client workstation provide the at least a portion of the debug information to the another processor.

36. The at least one program storage device of claim 33, wherein the tracing may continue without predefining to the client workstation the path taken by the transaction.

* * * * *